June 12, 1962 W. D. HUSTON 3,039,087
EARTH MOVING DEPTH INDICATOR
Filed Aug. 26, 1958

INVENTOR.
WILLIAM D. HUSTON
BY
Attorney

United States Patent Office 3,039,087
Patented June 12, 1962

3,039,087
EARTH MOVING DEPTH INDICATOR
William D. Huston, Rochester, N.Y., assignor, by mesne assignments, to American Radiator & Standard Sanitary Corporation, New York, N.Y., a corporation of Delaware
Filed Aug. 26, 1958, Ser. No. 757,357
3 Claims. (Cl. 340—282)

This invention relates to apparatus for indicating the position of a working member of a machine relative to the machine itself, and more particularly relates to an improved device for determining vertical or lateral depth, as the case may be, of the working member, such as a plow blade, bulldozer blade, or back hoe, of a piece of heavy mechanized earth moving equipment, during operation.

During the operation of any type of earth moving equipment, it often becomes necessary for the operator to accurately determine the depth, or size of the cut which he is taking. The tremendous vibration and shock, to which a bulldozer and its plow blade, for example, and the adjusting mechanism for the blade are subjected, render the conventional position indicating mechanisms inadequate. It is necessary to have an indicating device, which is rugged in construction, definite in its operation, and reliable in its performance.

In view of the above, one of the objects of this invention is to provide an improved indicating device which will withstand excessive amounts of strain, vibration, and shock during operation.

A further object of this invention is to provide an improved indicating mechanism which is so constructed that the likelihood of the introduction of foreign material, such as dust or dirt, in the interior moving parts, is reduced to an absolute minimum.

A still further object of this invention is to provide an improved indicating mechanism actuated by a variable resistor and having a slidable electric contact, which will exert an absolute pressure against the resistor regardless of the vibration or strain of the other mechanical portions of the device.

Other objects, purposes, and characteristic features of this invention will be apparent from the accompanying drawing, the specification, and the recital of the appended claims.

Figure 1:
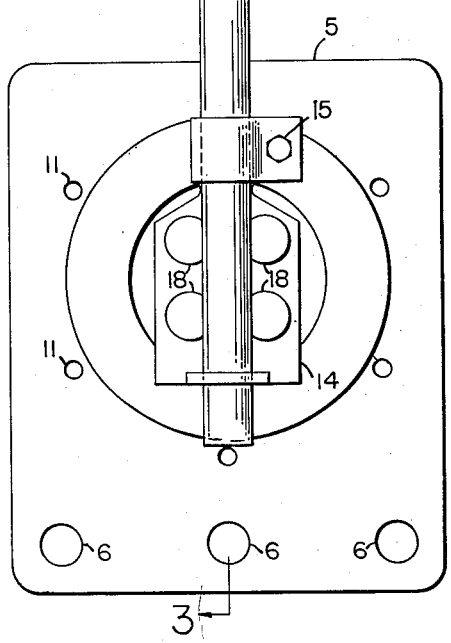
FIG. 1 is a front view of an indicator actuating mechanism built according to one embodiment of this invention.
Figure 3:
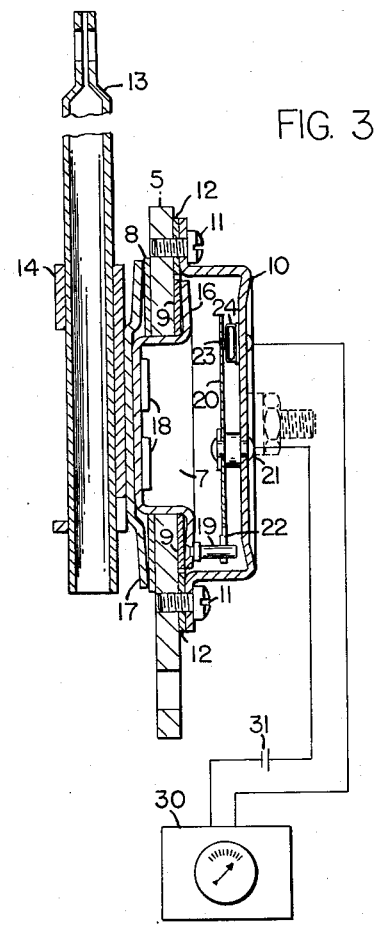
FIG. 3 is a cross-sectional view of the indicator mechanism taken through FIG. 1 at line 3—3, and also showing a typical ammeter circuit arrangement.
Figure 2:
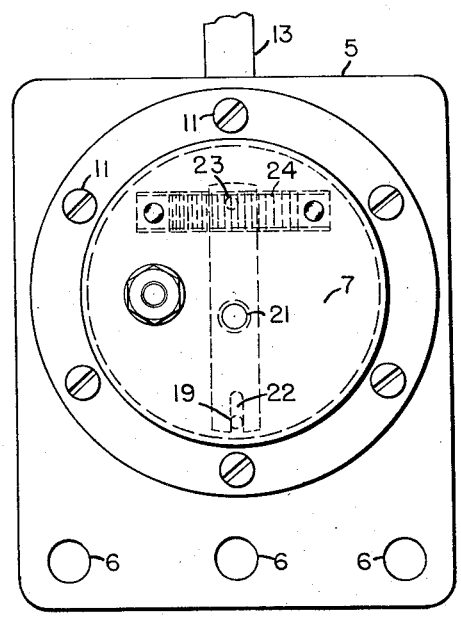
FIG. 2 is a rear view of this indicator actuating mechanism.

The indicating device herein disclosed is controlled by the vertical or lateral movement, as the case may be, of the earth moving working member of a piece of heavy machinery which causes an electrical contact arm to move along an electrical resistance coil, which coil and arm are connected in an electrical circuit with a meter or gauge to visually indicate to the operator the position of the earth working member relative to some null point such as the ground or the machine on which the earth working member is mounted.

Referring to the drawing, the indicating device comprises a base plate 5, which is suitably attached to the machine by inserting bolts or rivets through the openings 6. A lever arm 13 is adapted to be so connected at its outer end to the earth moving member, that a vertical or lateral movement, as the case may be, of the earth working member will cause the lever arm 13 to rock in an arc parallel to the surface of the base plate 5. The base plate 5 is also provided with a circular opening 7.

A cup shaped casing 10 is fastened by means of bolts 11, and sealed by means of the gasket 12 to the inner surface of the base plate 5, so that its hollow cup portion completely envelopes the surface surrounding the opening 7.

The lever arm 13 adjustably and slidably fits in a split clamp retaining member 14. The lever arm 13 is secured in the desired position relative to the retaining member 14 by a screw or bolt 15. The retaining member 14 is fastened to a bearing assembly 16, 17 by means of a plurality of rivets 18. The bearing assembly comprises an outer dish-shaped member 17 and an inner cup-shaped member 16. The outer member 17 is so configurated that it has a slightly dished central portion, and an outer marginal flange portion which is slightly inclined. Interposed between the outer face of the base plate 5 and the flange portion of the outer bearing member 17, is a bearing surface 8 such as brass, bronze or other rugged hard surfaced gasket material. The inner bearing member 16 is cup shaped. Its annular side wall fits in the opening 7; and at its inner end has a marginal flange. The flanged portion of the member 16 is bent at a slight angle toward the flanged portion of bearing member 17. Interposed between the inner surface of the base plate 5 and the flange of the member 16 is a wave type spring washer 9.

When in position, the outer bearing member 17 is fastened against the retaining member 14, and the marginal edge of the member 17 bears against the outer bearing surface 8. The inner member 16 is attached at its base in the central recess of the outer member 17. The cup shaped member 16 extends through the circular opening 7 in the base plate 5. The flanged portion of the member 16 rests against the wave spring washer 9 with its annular side wall and rotatably engages against the bounding wall of the circular opening 7. The bearing assembly is so constructed that when it is riveted in position the edges of the flanged portions of the members 17 and 16, which are bent toward the surface of the base plate 5, exert a frictional resilient gripping pressure against the respective members 8 and 9; and the arcuate movement of the lever arm 13 rotates the bearing assembly in the circular opening 7.

A pin 19 is attached to flanged portion of the member 16, and extends normal to the surface of the flanged portion. The pin 19 extends into a slot 22 which is provided in the lower end of an elongated flat spring member 20 which is preferably constructed of bronze material. The intermediate portion of the flat spring member 20 is pivotally connected to the interior of the casing 10 by means of the bearing 21. The upper end of the spring member 20 is provided with a raised contact portion 23 which tensionally bears against the surface of a resistance coil 24. The resistance coil 24 is fastened to the interior of the casing 10 in such a manner that the raised contact portion 23 of the elongated flat spring member 20 slides along the resistance coil 24 when the spring 20 pivots on its bearing 21.

The indicating device is shown as being connected to an electrical meter 30 such as a milliameter, which has a suitably graduated scale.

In operation, the motion of the earth moving member relative to its tractor causes the lever arm 13 to move in an arc, which causes the bearing assembly to rotate in the circular opening 7 of the base plate 5, thereby causing the pin 19 to rock the spring member 20 thereby moving the contact point 23 along the resistance coil 24. Through an electrical circuit including the spring contact arm 20, the resistance coil 24, a suitable source of current, such as battery 31, and the milliameter 30 all connected in series, the graduated scale of the milliameter 30 will directly reflect a change in resistance in the circuit. The lever arm 13 may be axially adjusted through the clamping apparatus upon loosening bolt or screw 15 on the retaining member 14 to either increase or decrease the arc ratio of the lever arm 13 with the spring contact arm 20.

It is apparent that the lever arm 13 the retaining member 14 and the members 16 and 17 are so connected, that undue stress or strain will not cause the lever arm 13, the retaining member 14, and the bearing members 16 and 17 to become loose or separated from one another. Also, a movement tending to push the lever arm 13 out of substantially parallel alignment with the surface of the base plate 5 thereby causing a lateral misalignment of the bearing members 16 and 17 does not affect the operation of the indicator but merely results in increasing or decreasing the angle of the flange of the member 16 and the angle of the outer edge of the member 17 relative to the adjoining surface of the base plate 5. It follows that the wave type spring washer 9 is also in a greater or less compressed relationship during such misalignment.

It is also apparent that normal operation or misalignment will not allow foreign matter to enter the interior of the device in the hollow portion of the casing 10 because one or the other of the bearing members increases its pressure against the bearing surface under such conditions.

Any vibration of the member 16 will not affect the spring contact arm 20, because the pin 19 is free to move in the slot 22. It is also apparent, that any deformation of the lower end of the spring contact arm 20 will not affect the pressure of the contact portion 23 on the resistance coil 24, because such pressure is determined by the pivot bearing 21.

Thus, we have provided an improved indicating device, which is rugged in construction, reliable in performance, and able to withstand the abnormal stresses and strains attending the operation of heavy earth moving equipment.

While the invention has been illustrated in connection with a device for indicating the depth of an earth moving working member during operation, it can also be used for indicating the position of the working member of any article of machinery. While the invention has been described, then, in connection with a particular embodiment thereof, it will be understood that it is capable of further modification, and this application is intended to cover any variations, uses, or adaptations of the invention following, in general, the principles of the invention, and including such departures from the present disclosure as come within known or customary practice in the art to which the invention pertains, and as fall within the scope of the invention or the limits of the appended claims.

Having thus described my invention, what I claim is:

1. An indicating device for use on heavy mechanized automotive equipment comprising a base plate having a circular opening therethrough which has a cylindrical bounding wall, a lever disposed at one side of said base plate, and means pivotally mounting said lever in said opening comprising a cup-shaped bearing member having an annular wall portion extending through said opening and engaging the cylindrical wall thereof and a marginal flange portion overlying the other side of said base plate around said opening, a second disc-shaped bearing member which overlies said one side of said base plate around said opening, means fixedly securing the bottom of said cup-shaped bearing member to said second disc-shaped bearing member centrally thereof, the flange of said cup-shaped bearing member and the marginal edge portion of said second disc-shaped bearing member being bent toward each other to resiliently engage the opposite sides of said base plate, means connecting said lever to said second bearing member to rotate said bearing members together relative to said base plate upon rotation of said lever, and means connected to one of the bearing members to indicate the rotation of said bearing members.

2. An indicating device for use on heavy mechanized automotive equipment, comprising a base plate having a circular opening therethrough which has a cylindrical bounding wall, a lever disposed at one side of said base plate, and means pivotally mounting said lever in said opening comprising a cup-shaped bearing member having an annular wall portion extending through said opening and engaging the cylindrical wall thereof and having a marginal flange portion overlying the other side of said base plate around said opening, a second, disc-shaped bearing member having a centrally-disposed recess and a marginal flange which overlies said one side of said base plate around said opening, means fixedly connecting the bottom of said cup-shaped bearing member to said second bearing member in the recess thereof, the flanged portions of the two bearing members being bent toward each other to resiliently engage opposite sides of the base plate, a retaining member connected to said second bearing member, and in which said lever is mounted for adjustment diametrically of the axis of rotation of said bearing members, a resistor spaced from the first named bearing member, a movable contact arm engaging said resistor in slidable contact, means connecting said first named bearing member to said contact arm to move said arm on rotation of said bearing members by said lever, and electrically-operated means in circuit with said resistor to indicate the angular position of said lever.

3. An indicating device for use on heavy mechanized automotive equipment comprising a base plate having a circular opening therethrough which has a cylindrical bounding wall, a lever disposed at one side of said base plate, and means pivotally mounting said lever in said opening comprising a cup-shaped bearing member having an annular wall portion extending through said opening and engaging the cylindrical wall thereof and having a marginal flange portion overlying the other side of said base plate around said opening, a second disc-shaped bearing member having a centrally-disposed recess and a marginal flange which overlies said one side of said base plate around said opening, means connecting the bottom of said cup-shaped bearing member fixedly to said second bearing member in said recess whereby said bearing members are rotatable together in said opening, the flanged portions of the two bearing members being bent toward one another to resiliently engage the opposite surfaces of said base plate around said opening, a casing sealingly attached to said other side of the base plate and enclosing said one bearing member, a wire-wound resistance coil mounted inside said casing and spaced from the first named bearing member, a contact arm pivotally mounted in said casing to pivot on an axis parallel to the axis of rotation of said bearing members and having one end in contact with said resistance coil, a member attached at one end to said first named bearing member and having its other end connected to said contact arm to move said contact arm upon rotation of said bearing members, and means connecting said lever to said second bearing member diametrally of said opening to rotate said bearing members upon rotation of said lever to vary the position of the contact arm along said resistance coil, and electrically-operated means in circuit with said resistor to indicate the position of said lever.

References Cited in the file of this patent

UNITED STATES PATENTS

| | | |
|---|---|---|
| 1,826,673 | Raus | Oct. 6, 1931 |
| 1,883,624 | Doran | Oct. 18, 1932 |
| 2,083,233 | Landenberger | June 8, 1937 |
| 2,408,188 | Austin | Sept. 24, 1946 |
| 2,593,332 | Mucher | Apr. 15, 1952 |
| 2,772,411 | Cooper | Nov. 27, 1956 |